United States Patent [19]
Kramer

[11] Patent Number: 5,239,755
[45] Date of Patent: Aug. 31, 1993

[54] CUTTING APPARATUS

[75] Inventor: Jochen Kramer, Stuttgart, Fed. Rep. of Germany

[73] Assignee: Andreas Stihl, Waiblingen

[21] Appl. No.: 856,129

[22] Filed: Mar. 23, 1992

[30] Foreign Application Priority Data

Mar. 21, 1991 [DE] Fed. Rep. of Germany ....... 4109282

[51] Int. Cl.$^5$ .............................................. B26B 15/00
[52] U.S. Cl. ....................................... 30/264; 30/263; 30/276
[58] Field of Search ....................... 30/296.1, 276, 260, 30/263, 346

[56] References Cited

U.S. PATENT DOCUMENTS

| | | | |
|---|---|---|---|
| 2,318,675 | 5/1943 | Congdon | 30/263 |
| 2,630,665 | 3/1953 | Lauer | 30/264 |
| 4,483,070 | 11/1984 | Junkermann | |
| 4,881,363 | 11/1989 | Terai et al. | 30/276 |
| 4,916,813 | 4/1990 | Elia | 30/276 |
| 5,027,591 | 7/1991 | Nakamura et al. | 30/276 |

Primary Examiner—Douglas D. Watts
Assistant Examiner—Paul M. Heyrana
Attorney, Agent, or Firm—Walter Ottesen

[57] ABSTRACT

The invention is directed to a cutter apparatus having a stationary blade and a rotating blade. The rotating blade is driven in rotation by a drive motor. The rotating motion causes the knife and blade to slide relative and over each other in a manner of scissors. The blade and knife each include a plurality of cutting edges with the cutting edges of the knife and blade being so arranged that they run toward each other at an angle opening outwardly. The cutting edges of the stationary blade are formed on radially extending fingers arranged in a star-shaped configuration which facilitates the manipulation of the cutter apparatus and improves the cutting quality thereof. The cutting apparatus is suitable for all kinds of vegetation including leaves and grass blades.

22 Claims, 6 Drawing Sheets

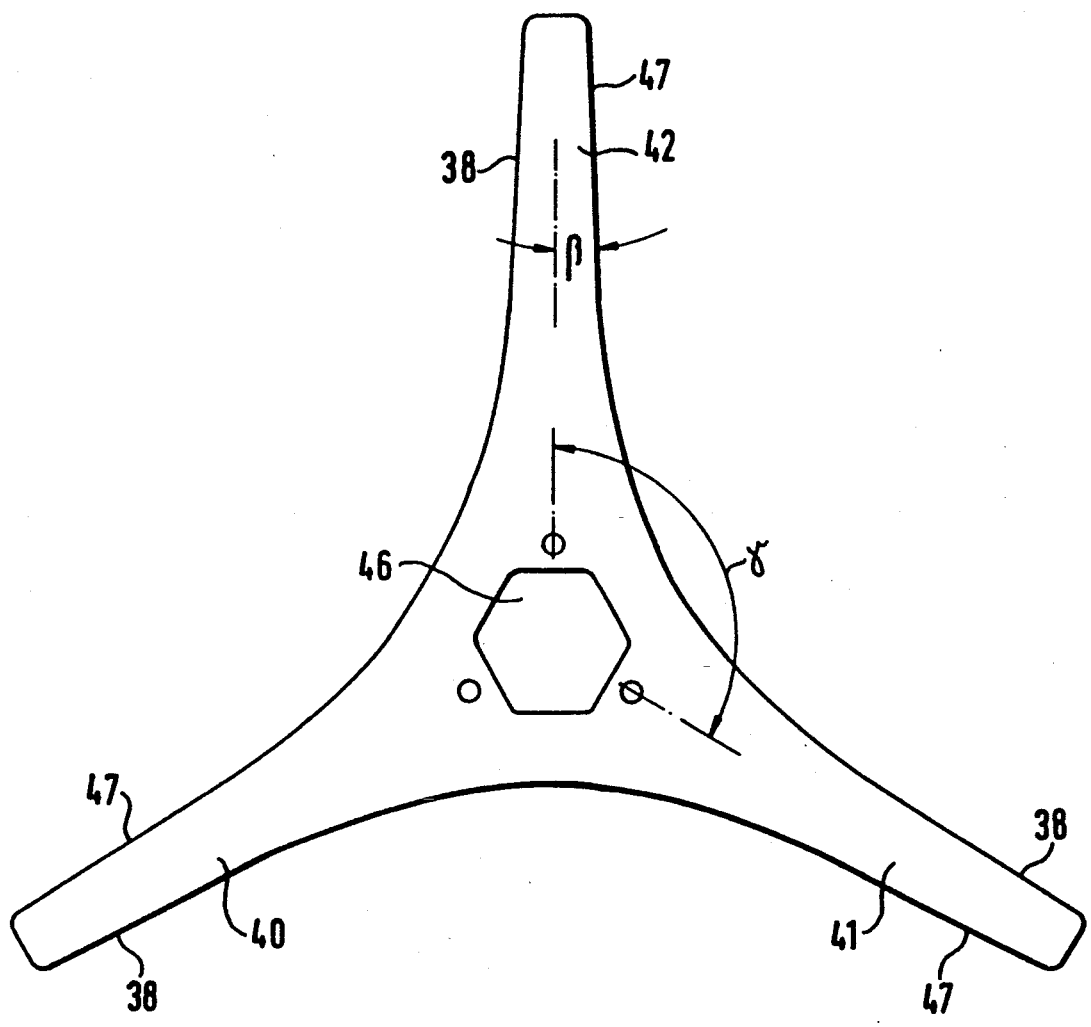

CUTTING APPARATUS

FIELD OF THE INVENTION

The invention relates to a cutting apparatus and especially a cutting apparatus for cutting vegetation.

BACKGROUND OF THE INVENTION

Published German patent application DE-A 3,248,679 discloses a lawn mower having a fixed blade and a rotating knife. The cutting apparatus includes a drive motor which imparts rotational movement to the knife whereby the knife and blade slide toward each other in a relative movement. The fixed blade has several cutting edges as has the rotating knife with these cutting edges being brought into cutting engagement so that they cut the grass blades in a manner similar to scissors. In the known arrangement, the cutting surfaces of the blade are configured so as to be curved and extend approximately in the tangential direction to an approximately circular-shaped center part of the blade. Two sections of the circular periphery are provided with long cutting surfaces and two sections of the peripheral surface are provided with short cutting surfaces. The rotating knife has extended cutting surfaces which likewise are arranged tangentially to the circular-shaped center portion of the knife.

In the known arrangement, the blade and knife have a complicated form and the number of cutting surfaces is limited because of the tangential direction of these cutting surfaces. The number of cutting surfaces is especially limited when it is intended that a high cutting capacity be achieved with the long cutting edges. The configurations of the cutting surfaces on the blade are different over the periphery and are unsuitable for cutting work with the so-called scythe movement. These configurations furthermore lead to a heavy embodiment of knife and blade whereby the cutterhead is very heavy and therefore requires a corresponding expenditure of effort by the operator.

U.S. Pat. No. 4,483,070 discloses measures which facilitate the manipulation of such apparatus for the operator with respect to its weight. However, such measures limit the freedom of movement of apparatus of this kind and require a bendable drive shaft between the drive motor and the rotating knife with the drive motor being strapped to the back of the operator.

SUMMARY OF THE INVENTION

It is an object of the invention to improve the cutting apparatus of the kind described above so that the apparatus is easier to manipulate and ensures a high cutting capacity as well as a good cutting quality which is independent of the direction of movement.

The cutting apparatus of the invention is especially for cutting vegetation and includes: a housing; a blade fixedly mounted on the housing; a knife rotatably journalled in the housing to define a rotational axis and so as to be slidingly movable over the blade; drive means for driving the knife in rotation to cause the knife and the blade to move relative to each other; the knife having at least one cutting knife edge and the blade having a plurality of cutting blade edges whereby the knife edge enters into cutting engagement with each of the blade edges sequentially as the knife rotates; the knife and blade being arranged so as to cause the knife edge and the blade edge which is in cutting engagement therewith at any particular instant to conjointly define an angle opening outwardly referred to the rotational axis; the blade having a plurality of fingers configured to define a star-shaped configuration with the fingers extending radially from the rotational axis; and, the blade edges being formed on respective ones of the fingers.

Thus, the cutting edges of the blade are arranged on star-shaped radially extending fingers. This arrangement ensures that the introduction of the material to be cut is independent of the direction of movement of the cutting apparatus and the tendency of bending or pressing the material to be cut away is not present because of the form of the fingers.

According to an advantageous embodiment of the invention, the number of fingers of the blade are an even number and the fingers are arranged so as to be radially symmetrical. As an alternative, the blade however can also have an uneven number of fingers. The angles between the fingers of the blade can all be exactly the same. Thus, each two mutually adjacent ones of the fingers conjointly define an angle and the angles between each two mutually adjacent ones of the fingers can be made equal. However, it has been found advantageous to arrange the fingers at different angle spacings from each other. Such an embodiment of the blade is combined with a multi-wing knife having equal angle spacing. This leads to the condition that one wing always does the bulk of the cutting in time sequence while the other wing or wings provide a support function whereby the knife is held in reliable contact engagement on the blade. Because of the rotation of the knife, all wings sequentially carry out a cutting operation and a support function.

A preferred embodiment of the knife provides that it be configured with three wings with these wings being arranged so that each two mutually adjacent wings are separated by 120° and a cutting edge is provided on each wing. This embodiment of the knife leads to a least possible dulling effect of the cutting edges. This configuration furthermore provides the advantage that the forward edge and the rearward edge of a wing, referred to the direction of rotation, are arranged so that they converge in the radially outward direction. The forward edge is configured as a cutting edge and this cutting edge and the rearward edge of the wing conjointly define an angle which preferably lies in the range from 4° to 5°.

Embodiments wherein the blade has at least twelve and a maximum of sixteen fingers is viewed as an especially suitable arrangement. In a preferred embodiment, the above-mentioned three-winged knife is provided with fourteen fingers and the angular spacing of each two mutually adjacent fingers is between 23° to 28°. To avoid having the cutting apparatus come into inadvertent cutting contact with the ground or with obstacles, a preferred embodiment of the invention provides for a slide plate or a slide bracket to be attached to the side of the cutting apparatus facing away from the housing with the cutting apparatus having a blade and knife.

BRIEF DESCRIPTION OF THE DRAWINGS

The invention will now be described with reference to the drawings wherein:

FIG. 6 is a plan view of the knife of the cutting apparatus.

DESCRIPTION OF THE PREFERRED EMBODIMENTS OF THE INVENTION

Figure 1:
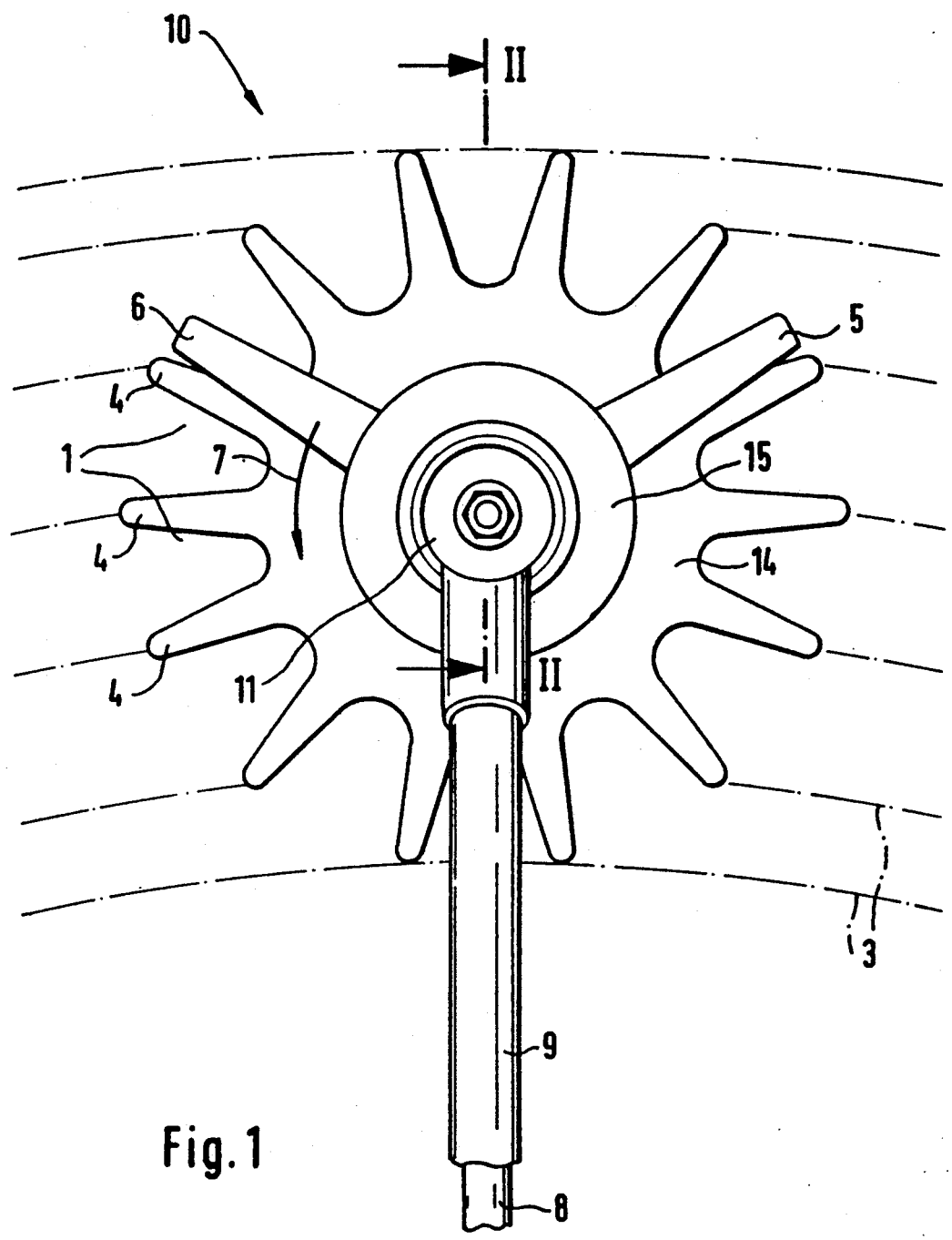
FIG. 1 is a plan view of the cutterhead of a cutting apparatus according to an embodiment of the invention.

FIG. 1 shows a cutterhead 10 of a cutting apparatus with the cutterhead 10 being attached to the end of a hollow rod 9. A drive shaft 8 extends through the hollow rod and is driven by a motor (not shown). The cutterhead 10 includes a housing 11 and a rotatably journalled knife 15 of which two wings 5 and 6 are shown in FIG. 1. The cutterhead further includes a stationary blade 14 having a plurality of radially extending fingers 4. A V-shaped cutout 1 is formed between each two mutually adjacent fingers 4. The vegetation to be cut enters into the cutouts during the movement of the cutterhead 10 which, for example, is moved in a manner of a scythe with this movement being indicated by the curved lines 3. The knife 15 rotates in the direction of arrow 7 so that the wings 5 and 6 are moved relative to the fingers 4 and, in this way, cause the V-shaped gap between the fingers 4 and wings 5 or 6 to be closed to zero in accordance with the principle of scissors operation. The fingers 4 of the blade 14 and the wings (5, 6) of the knife 15 are equipped for this purpose with cutting edges at the edges brought together in cutting engagement.

Figure 2:
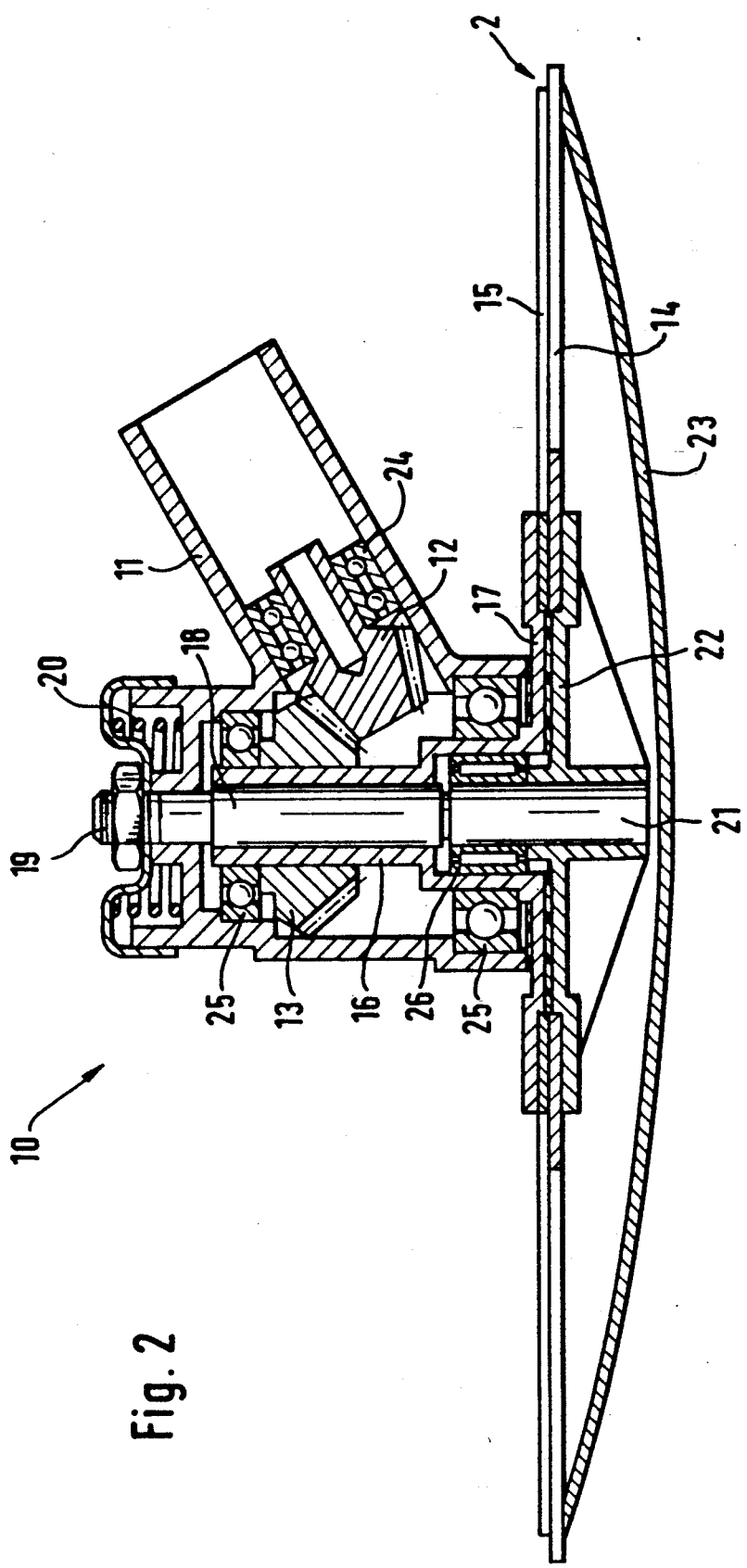
FIG. 2 is an axial section taken along line II—II of FIG. 1.

The section view of FIG. 2 is taken through the cutterhead 10 and shows the housing 11 with the gearing disposed therein comprising a pinion 12 and a bevel gear 13 and also shows the cutting device comprising the blade 14 and the knife 15. The bevel gear 13 is seated on a hollow shaft 16 which is rotatably journalled in the housing 11 and projects from the housing 11 with a plate-shaped end portion 17. The knife 15 is attached to the plate-shaped end portion 17. A bolt 18 extends through the hollow shaft 16 and has first and second ends 19 and 21. The first end 19 is held in the housing 11 so that it can be tensioned and spring means in the form of a spring 20 is interposed to act between the housing 11 and the end of the bolt 19 as shown in FIG. 2. The second end 21 of the bolt 18 projects outwardly from the plate-shaped end 17 of the hollow shaft 16. A carrier plate 22 is pressed or shrunk onto the second end 21 of the bolt 18 and is provided for holding the blade 14. A slide bracket 23 is attached to the side of the blade 14 facing away from the housing 11.

The pinion 12 is supported by the ball bearings 24 and is rotated by means of a drive shaft not shown in FIG. 2. The hollow shaft 16 is supported in the housing 11 by means of the ball bearings 25 and is rotated by the meshing engagement of the teeth of the pinion 12 and the teeth of the bevel gear 13. In this way, the knife 15 is also rotated. A needle bearing 26 is provided between hollow shaft 16 and bolt 18 to provide a precise guidance of the bolt 18 in the region adjacent to the cutting device 2.

Figure 3:
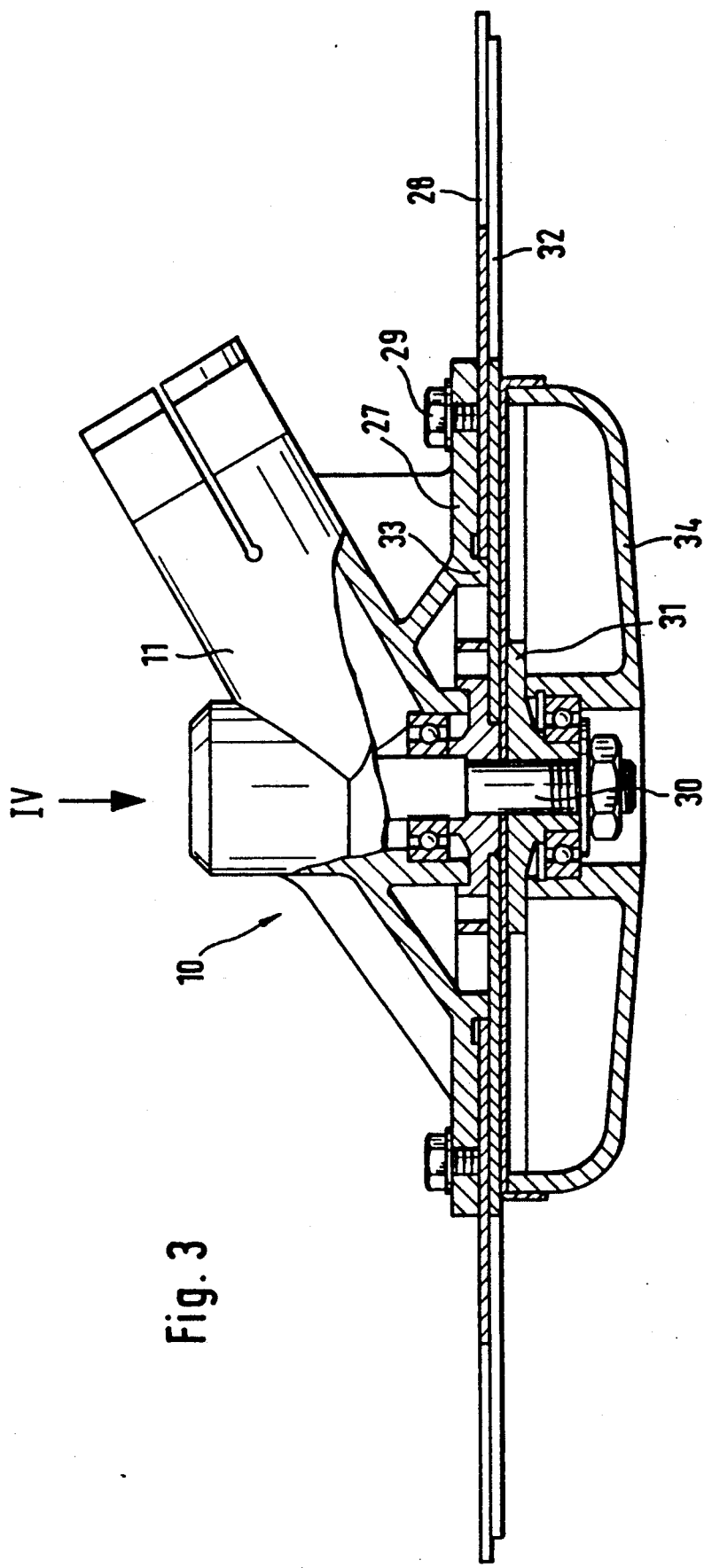
FIG. 3 is a side elevation view, partially in section, of another embodiment of the cutting apparatus of the invention.

FIG. 3 shows a section view through an alternate embodiment of the cutterhead 10. The cutterhead 10 includes a housing 11 having a flange 27 to which a blade 28 is attached by means of screws 29. The blade 28 has a central opening through which a sleeve-shaped housing extension 33 projects with a drive shaft 30 journalled therein. A holder 31 for a knife 32 is attached to the end of drive shaft 30. A slide plate 34 is mounted below the housing extension 33 and prevents that the rotating parts scrape on the ground or come into contact with obstacles.

Figure 4:
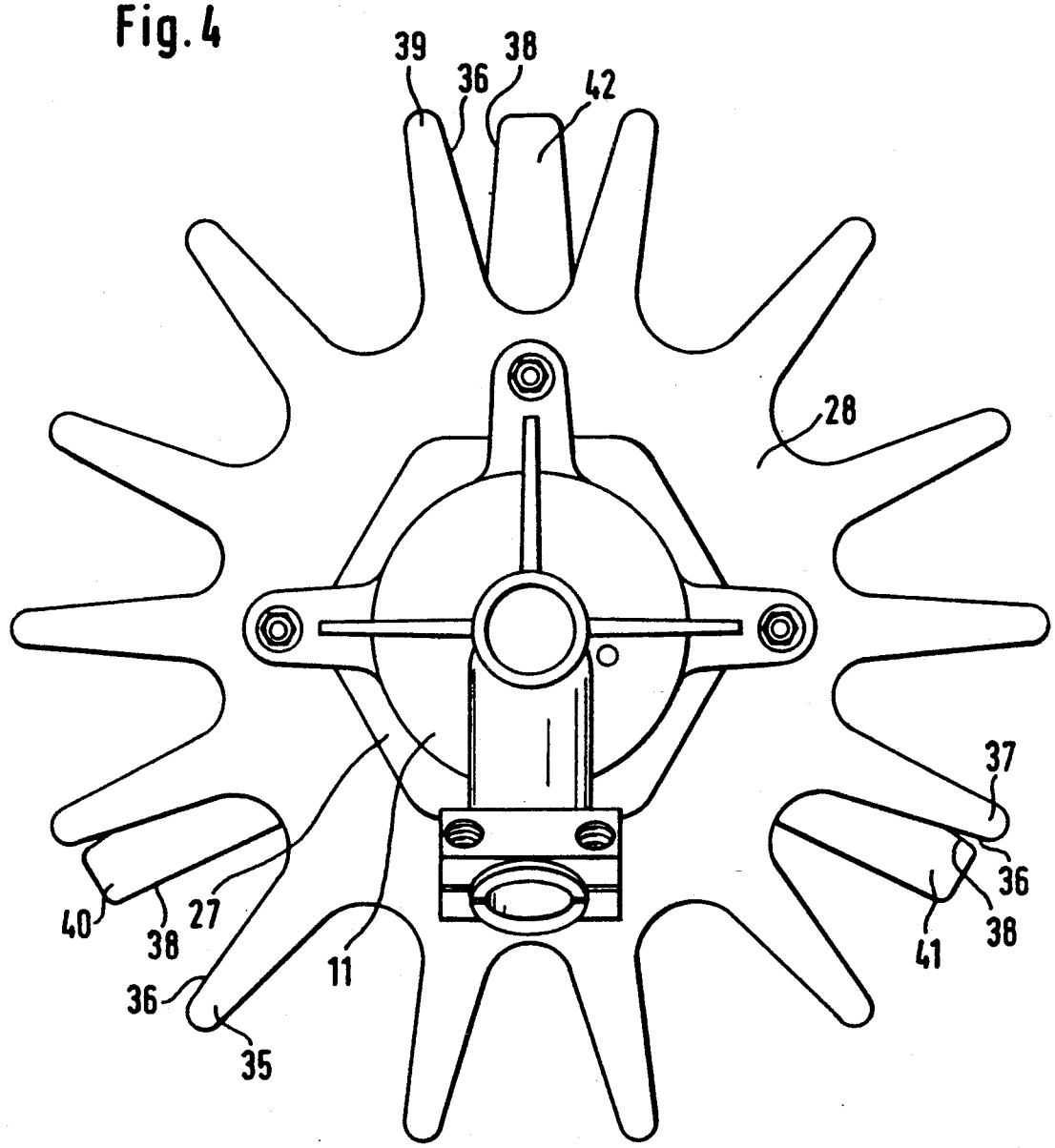
FIG. 4 is a plan view of the cutting apparatus of FIG. 3 viewed in the direction of arrow IV of FIG. 3.

The plan view of FIG. 4 shows that the blade 28 attached to the flange 27 includes a plurality of fingers 35, 37 and 39 having respective radial edges which are configured as cutting edges 36. The knife 32 is almost completely covered in FIG. 4 and only the three wings 40, 41 and 42 thereof can be seen. The wings 40, 41 and 42 extend radially somewhat less than the fingers 35, 37 and 39 of the blade 28. The edges 38 of the wings 40, 41 and 42 are configured as cutting edges viewed in the direction of rotation. These cutting edges and the cutting edges of blade 28 come into cutting engagement with each other and conjointly define an angle opening outwardly in the radial direction.

In FIG. 4, the spacings of the forward cutting edges 38 of the fingers 40, 41 and 42 to respective ones of the next adjacent cutting edges 36 of the fingers 35, 37 and 39 are different because of the arrangement of the fingers 35, 37 and 39. Accordingly, only the cutting edge 38 of the wing 42 will be fully loaded while the two other wings 40 and 41 primarily perform a support or bracing function. As the knife 32 rotates, the cutting edge 38 of the wing 40 comes into cutting engagement with the cutting edge 36 of the finger 35 and the load on the two other wings 41 and 42 becomes less.

In the embodiment shown in FIG. 4, the blade 28 has 14 fingers and the knife 32 has three wings with each wing having a cutting edge. Thus, blade 28 has more than three times as many fingers as the knife has cutting edges.

Figure 5:
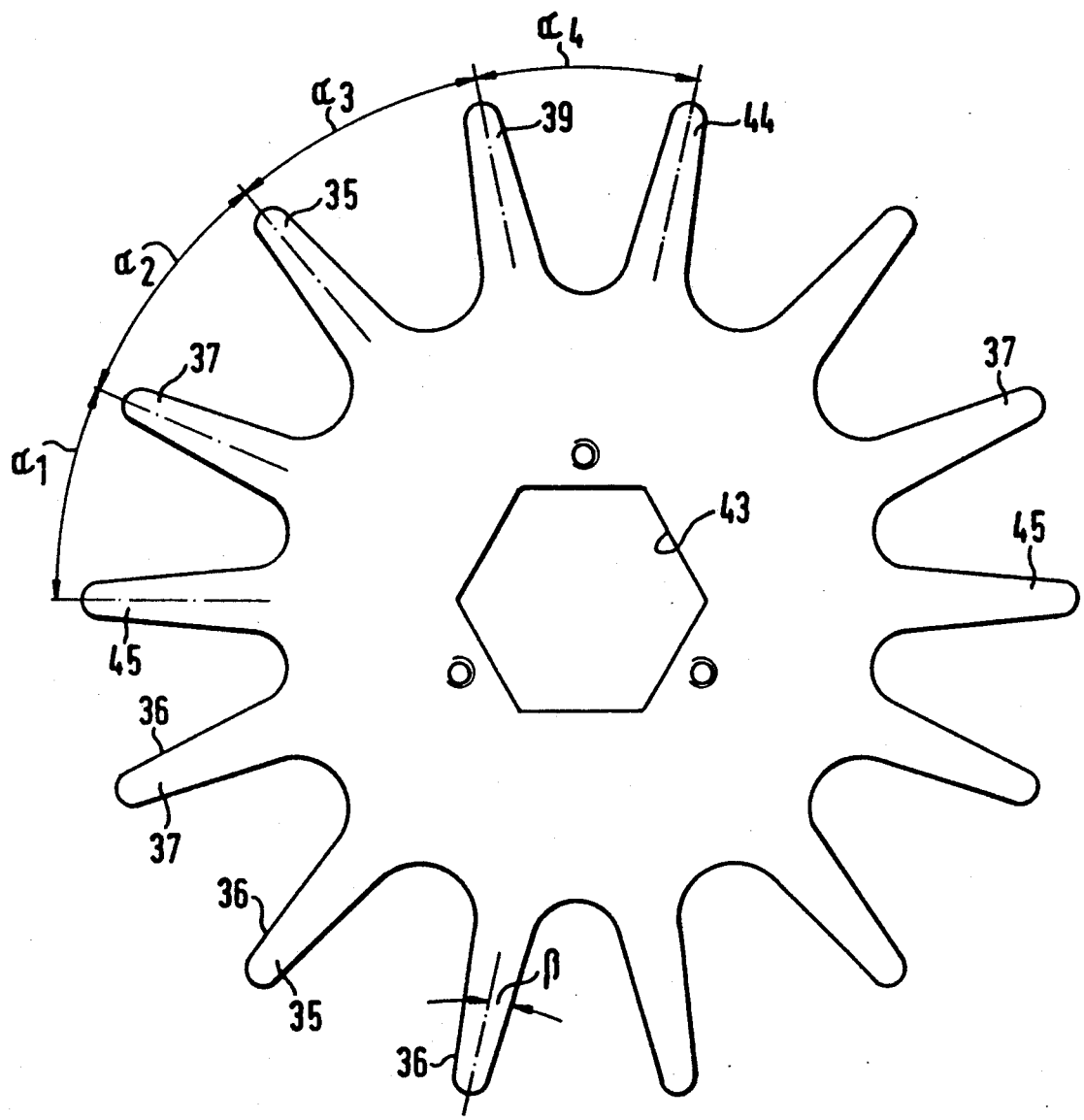
FIG. 5 is plan view of a blade of the cutting apparatus.

FIG. 5 shows the blade 14 or 28 as an individual part and that this part has a central opening 43 in the form of a hexagon. Mutually adjacent ones of the fingers have different spacings therebetween with the angle between fingers 45 and 37 being identified as $\alpha_1$, the angle between fingers 37 and 35 as $\alpha_2$, the angle between the fingers 35 and 39 as $\alpha_3$ and the angle between the fingers 39 and 44 as $\alpha_4$. In a specific embodiment, the angles can have the following values: $\alpha_1 = 23°$, $\alpha_2 = 26.5°$, $\alpha_3 = 28°$ and $\alpha_4 = 25°$. Since the angle $\alpha_4$ appears only twice on the circular periphery, the angles $\alpha_1$, $\alpha_2$ and $\alpha_3$ however occur four times, an overall angle of 360° is provided.

FIG. 6 shows the knife 15 or 32 as a single piece. The knife has a central opening 46 and is configured to have three wings with the wings 40, 41 and 42 being arranged so that each two mutually adjacent ones of said wings conjointly define an angle $\gamma$ of 120° therebetween. The forward edge acting as cutting edge 38 and the rearward edge 47 extend at an angle $\beta$ to the radial and this angle $\beta$ lies in a range from 4° to 5°. The angle $\beta$ can preferably also be selected to be somewhat greater or somewhat smaller; however, this angle should be greater than 1°. A like angle $\beta$ is defined by the cutting edge 36 with respect to the radial whereby a cut in a nature of scissors results. Material which is not to be cut is therefore pushed outwardly in the radial direction and cannot block the cutter apparatus.

The cutting apparatus according to the invention having a blade and knife configured in the manner described above enables the cutterhead to have a reduced weight which makes guiding the apparatus easier for the operator. Furthermore, the load is applied to the wings of the knife sequentially and, in this way, reduces the required drive force whereby the drive motor can be configured to be smaller and lighter.

It is understood that the foregoing description is that of the preferred embodiments of the invention and that various changes and modifications may be made thereto without departing from the spirit and scope of the invention as defined in the appended claims.

What is claimed is:

1. A cutting apparatus for cutting vegetation by passing the apparatus over the ground in a direction substantially parallel thereto in the manner of a scythe whereby said cutting apparatus is arcuately moved left and right by an operator, said cutting apparatus comprising:
   a housing;
   a blade fixedly mounted on said housing so as to be disposed substantially parallel to the ground when said cutting apparatus is in operational use;
   a knife rotatably journalled in said housing to define a rotational axis and so as to be slidingly movable over said blade;
   drive means for driving said knife in rotation to cause said knife and said blade to move relative to each other;
   said knife having at least one cutting knife edge and said blade having a plurality of cutting blade edges whereby said knife edge enters into cutting engagement with each of said blade edges sequentially as said knife rotates;
   said knife and said blade being arranged so as to cause said knife edge and the blade edge which is in cutting engagement therewith at any particular instant to conjointly define an angle opening outwardly referred to said rotational axis so as to cause said knife edge and the blade edge to conjointly effect a scissors cutting action as said knife edge moves over said blade edge;
   said blade having a plurality of fingers configured to define a star-shaped configuration with said fingers extending radially from said rotational axis about the entire periphery of said blade thereby permitting the cutting apparatus to be moved forwardly and rearwardly as well as in the manner of a scythe;
   said fingers being arranged radially symmetrically with respect to said rotational axis so as to cause each two radially symmetrically disposed fingers to lie opposite each other on a common diameter through said axis;
   said fingers being arranged so as to cause the angles between selected ones of mutually adjacent fingers to be different; and,
   said blade edges being formed on respective ones of said fingers.

2. The cutting apparatus of claim 1, wherein the number of said fingers is an even number and said fingers are arranged radially symmetrically relative to said axis.

3. The cutting apparatus of claim 1, wherein the number of said fingers is an uneven number.

4. The cutting apparatus of claim 1, wherein the number of said fingers lies in a range between 12 and 16.

5. The cutting apparatus of claim 1, said fingers being 14 in number and the angular spacing between each two mutually adjacent ones of said fingers being between 23° and 28°.

6. The cutting apparatus of claim 1, said knife having three wings each having a forward edge facing in the direction of rotation and each two mutually adjacent ones of said wings being angularly spaced 120° from each other; said knife also having three of said cutting knife edges formed on respective ones of said forward edges; said wings also having respective rearward edges and the forward edge and the rearward edge of each wing being arranged thereon to both converge toward each other outwardly with increasing distance from said rotational axis.

7. The cutting apparatus of claim 6, wherein the forward edge and the rearward edge of each of said wings each defines an angle $\beta$ with a radius bisecting the wing; and, said angle $\beta$ lying in the range of 4° to 5°.

8. The cutting apparatus of claim 1, wherein said knife has a side facing toward said drive means and said blade is mounted on said housing so as to be directly adjacent said side of said knife.

9. The cutting apparatus of claim 8, further comprising slide means connected to said housing so as to be disposed below said blade and said knife.

10. The cutting apparatus of claim 1, wherein the blade has a number (n) of said fingers and said knife has a number (p) of said knife edges; and, wherein $n > 3p$.

11. A cutting apparatus for cutting vegetation by passing the apparatus over the ground in a direction substantially parallel thereto in the manner of a scythe, whereby said cutting apparatus is arcuately moved left and right by an operator, said cutting apparatus comprising:
   a housing;
   a blade fixedly mounted on said housing so as to be disposed substantially parallel to the ground when said cutting apparatus is in operational use;
   a knife rotatably journalled in said housing to define a rotational axis and so as to be slidingly movable over said blade;
   drive means for driving said knife in rotation to cause said knife and said blade to move relative to each other;
   said knife having a plurality of wings extending outwardly from said axis and each of said wings having a cutting knife edge formed thereon;
   said blade having a plurality of cutting blade edges whereby said knife edges enter into cutting engagement with each of said blade edges sequentially as said knife rotates;
   said knife and said blade being arranged so as to cause said knife edge and the blade edge which is in cutting engagement therewith at any particular instant to conjointly define an angle opening outwardly referred to said rotational axis so as to cause said knife edge and the blade edge to conjointly effect a scissors cutting action as said knife edge moves over said blade edge;
   said blade having a plurality of fingers configured to define a star-shaped configuration with said fingers extending radially from said rotational axis about the entire periphery of said blade thereby permitting the cutting apparatus to be moved forwardly and rearwardly as well as in the manner of a scythe;
   said fingers being arranged radially symmetrically with respect to said rotational axis so as to cause each two radially symmetrically disposed fingers to lie opposite each other on a common diameter through said axis;
   said blades having respective tips which trace respective arcs centered on an imaginary center defined by the operator as the operator swings said cutting apparatus to the left and right;

said blade edges being formed on respective ones of said fingers;

each two mutually adjacent ones of said fingers being separated by an angle α and conjointly defining an entry opening therebetween into which vegetation to be cut enters during the left and right arcuate movements of the cutting apparatus; and, said fingers being arranged so as to cause the angles between selected ones of mutually adjacent fingers to be different so as to cause said wings and the respective knife edges thereof to do most of the cutting in time sequence while the remainder of said wings provide a support function to hold said knife in reliable contact engagement on said blade and so as to cause each two mutually adjacent ones of a plurality of said arcs to be at approximately equal spacings from each other thereby causing the entry openings of the fingers tracing said plurality of arcs to all receive substantially the same amount of vegetation to be cut whereby a substantially uniform load is imparted to said knife during said operational use.

12. The cutting apparatus of claim 11, wherein the number of said fingers lies in a range between 12 and 16.

13. The cutting apparatus of claim 11, said fingers being 14 in number and the angular spacing between each two mutually adjacent ones of said fingers being between 23° and 28°.

14. The cutting apparatus of claim 11, said knife having three of said wings each having a forward edge facing in the direction of rotation and each two mutually adjacent ones of said wings being angularly spaced 120° from each other; said knife also having three of said cutting knife edges formed on respective ones of said forward edges; said wings also having respective rearward edges and the forward edge and the rearward edge of each wing being arranged thereon to both converge toward each other outwardly with increasing distance from said rotational axis.

15. The cutting apparatus of claim 14, wherein the forward edge and the rearward edge of each of said wings each defines an angle β with a radius bisecting the wing; and, said angle β lying in the range of 4° to 5°.

16. The cutting apparatus of claim 11, wherein said knife has a side facing toward said drive means and said blade is mounted on said housing so as to be directly adjacent said side of said knife.

17. The cutting apparatus of claim 16, further comprising slide means connected to said housing so as to be disposed below said blade and said knife.

18. The cutting apparatus of claim 11, wherein the number of said fingers is an even number and said fingers are arranged radially symmetrically relative to said axis.

19. The cutting apparatus of claim 11, wherein the number of said fingers is an uneven number.

20. The cutting apparatus of claim 11, wherein said blade has a number (n) of said fingers and said knife has a number (p) of said knife edges; and, wherein n>3p.

21. A cutting apparatus for cutting vegetation by passing the apparatus over the ground in a direction substantially parallel thereto forwardly and rearwardly as well as in the manner of a scythe whereby said cutting apparatus is arcuately moved left and right by an operator, said cutting apparatus comprising:

a housing;

a blade fixedly mounted on said housing so as to be disposed substantially parallel to the ground when said cutting apparatus is in operational use;

a knife rotatably journalled in said housing to define a rotational axis and so as to be slidingly movable over said blade;

drive means for driving said knife in rotation to cause said knife and said blade to move relative to each other;

said knife having at least one cutting knife edge and said blade having a plurality of cutting blade edges whereby said knife edge enters into cutting engagement with each of said blade edges sequentially as said knife rotates;

said knife and said blade being arranged so as to cause said knife edge and the blade edge which is in cutting contact engagement therewith at any particular instant to conjointly define an angle opening outwardly referred to said rotational axis so as to cause said knife edge and the blade edge to conjointly effect a scissors cutting a action as said knife edge moves over said blade edge;

said blade having a plurality of fingers configured to define a star-shaped configuration with said fingers extending radially from said rotational axis about the entire periphery of said blade thereby permitting the cutting apparatus to be moved forwardly and rearwardly as well as in the manner of a scythe;

said fingers being arranged radially symmetrically with respect to said rotational axis so as to cause each two radially symmetrically disposed fingers to lie opposite each other on a common diameter through said axis;

said blades having respectively tips which trace respective arcs centered on an imaginary center defined by the operator as the operator swings said cutting apparatus to the left and right;

said blade edges being formed on respective ones of said fingers;

each two mutually adjacent ones of said fingers being separated by an angle α and conjointly defining an entry opening therebetween into which vegetation to be cut enters during the left and right arcuate movements of the cutting apparatus; and, said fingers being arranged so as to cause the angles between selected ones of mutually adjacent fingers to be different so as to cause each two mutually adjacent ones of a plurality of said arcs to be at approximately equal spacings from each other thereby causing the entry openings of the fingers tracing said plurality of arcs to all receive substantially the same amount of vegetation to be cut whereby a substantially uniform load is imparted to said knife during said operational use.

22. A cutting apparatus for cutting vegetation by passing the apparatus over the ground in a direction substantially parallel thereto forwardly or rearwardly as well as in the manner of a scythe, whereby said cutting apparatus is arcuately moved left and right by an operator, said cutting apparatus comprising:

a housing;

a blade fixedly mounted on said housing so as to be disposed substantially parallel to the ground when said cutting apparatus is in operational use;

a knife rotatably journalled in said housing to define a rotational axis and so as to be slidingly movable over said blade;

drive means for driving said knife in rotation to cause said knife and said blade to move relative to each other;

said knife having a plurality of wings extending outwardly from said axis and each of said wings having a cutting knife edge formed thereon;

said blade having a plurality of cutting blade edges whereby said knife edges enter into cutting engagement with each of said blade edges sequentially as said knife rotates;

said knife and said blade being arranged so as to cause said knife edge and the blade edge which is in cutting engagement therewith at any particular instant to conjointly define an angle opening outwardly referred to said rotational axis so as to cause said knife edge and the blade edge to conjointly effect a scissors cutting action as said knife edge moves over said blade edge;

said blade having a plurality of fingers configured to define a star-shaped configuration with said fingers extending radially from said rotational axis thereby permitting the cutting apparatus to be moved forwardly and rearwardly as well as in the manner of a scythe;

said fingers being arranged radially symmetrically with respect to said rotational axis so as to cause each two radially symmetrically disposed fingers to lie opposite each other on a common diameter through said axis;

said blades having respective tips which trace respective arcs centered on an imaginary center defined by the operator as the operator swings said cutting apparatus to the left and right;

said blade edges being formed on respective ones of said fingers;

each two mutually adjacent ones of said fingers being separated by an angle $\alpha$ and conjointly defining an entry opening therebetween into which vegetation to be cut enters during the left and right arcuate movements of the cutting apparatus;

said fingers being arranged so as to cause the angles between selected ones of mutually adjacent fingers to be different so as to cause said wings and the respective knife edges thereof to do most of the cutting in time sequence while the remainder of said wings provide a support function to hold said knife in reliable contact engagement on said blade and so as to cause each two mutually adjacent ones of a plurality of said arcs to be at approximately equal spacings from each other thereby causing the entry openings of the fingers tracing said plurality of arcs to all receive substantially the same amount of vegetation to be cut whereby a substantially uniform load is imparted to said knife during said operational use; and, said blade having a number (n) of said fingers and said knife having a number (p) of said knife edges with (n) being greater than 3(p).

* * * * *